US011237920B1

(12) United States Patent
Fazio

(10) Patent No.: US 11,237,920 B1
(45) Date of Patent: Feb. 1, 2022

(54) DISTRIBUTED SOFTWARE REPLICATION AND REPLACEMENT SYSTEM

(71) Applicant: Cigna Intellectual Property, Inc., Wilmington, DE (US)

(72) Inventor: Frank R. Fazio, West Springfield, MA (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 17 days.

(21) Appl. No.: 16/687,839

(22) Filed: Nov. 19, 2019

(51) Int. Cl.
*G06F 11/14* (2006.01)

(52) U.S. Cl.
CPC ...... *G06F 11/1464* (2013.01); *G06F 11/1451* (2013.01); *G06F 11/1469* (2013.01)

(58) Field of Classification Search
CPC ............. G06F 11/1464; G06F 11/1451; G06F 11/1469
USPC .......................................................... 711/162
See application file for complete search history.

(56) References Cited

U.S. PATENT DOCUMENTS

| | | | |
|---|---|---|---|
| 7,426,652 | B2 | 9/2008 | Liccione |
| 9,146,722 | B2 | 9/2015 | Lu |
| 9,213,534 | B2 | 12/2015 | Brehm |
| 9,588,972 | B2 | 3/2017 | Dwarampudi |
| 9,778,816 | B2 | 10/2017 | Ryu |
| 2002/0095416 | A1* | 7/2002 | Schwols ................. G06F 16/10 |
| 2009/0265702 | A1 | 10/2009 | Lu |
| 2011/0022986 | A1* | 1/2011 | Dumais ..................... G06F 8/60 715/835 |
| 2012/0323857 | A1* | 12/2012 | Brehm ..................... G06F 8/61 707/674 |
| 2013/0290267 | A1* | 10/2013 | Dwarampudi .......... G06F 9/445 707/667 |

(Continued)

FOREIGN PATENT DOCUMENTS

CN 102945159 A 2/2013

OTHER PUBLICATIONS

How to Delete and Offload Unused Apps to Free Up Space in iOS 11, https://www.groovypost.com/howto/delete-offload-unused-apps-free-up-space-ios-11/, Dec. 31, 2018.

*Primary Examiner* — David Yi
*Assistant Examiner* — Zubair Ahmed
(74) *Attorney, Agent, or Firm* — Miller Johnson

(57) ABSTRACT

A computer system includes memory configured to store software application files, and a processor configured to execute computer executable instructions. The instructions include identifying a target software application, archiving files of the target software application, and creating, in the directory, one or more replacement executable files that correspond to one or more executable files of the target software application. The instructions include detecting, by a first replacement executable file of the one or more replacement executable files, an execution call to the first replacement executable file corresponding to a first executable file of the target software application. The instructions include, in response to detection of the detected execution call, restoring files of the target software application and forwarding the detected execution call to the first executable file of the target software application in the directory to allow the first executable file to process the detected execution call.

19 Claims, 4 Drawing Sheets

(56) References Cited

U.S. PATENT DOCUMENTS

2014/0215366 A1\* 7/2014 Ryu .................... G06F 3/04817
                                                                         715/765

\* cited by examiner

DISTRIBUTED SOFTWARE REPLICATION AND REPLACEMENT SYSTEM

FIELD

The present disclosure relates to software deployment in a distributed environment and more particularly to automated management of unused software applications in a distributed environment.

BACKGROUND

Distributed software applications can become susceptible to security flaws if the latest patches, versions, etc. are not constantly maintained and updated. However, it can be very difficult to always find all instances of a distributed software application within a managed computer network (e.g., all instances of distributed JAVA applications on computers of a company network, etc.), in order to constantly maintain the latest updated patches, versions, etc. for all instances within the network.

In some cases, instances of a distributed software application that have not been used for some period of time may be uninstalled to avoid potential security flaws if the unused application is an outdated or unpatched version. However, if the uninstalled software is needed by a computer in the network at a later time, there could be production issues due to the removed software.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system includes memory and a processor. The memory is configured to store software application files and computer executable instructions. The processor is configured to execute the computer executable instructions. The instructions include identifying a target software application. The instructions include archiving files of the target software application, including archiving one or more executable files from a directory of the target software application. The instructions include creating, in the directory, one or more replacement executable files that correspond to the one or more executable files of the target software application. The instructions include detecting, by a first replacement executable file of the one or more replacement executable files, an execution call to the first replacement executable file. The first replacement executable file corresponds to a first executable file of the target software application. The instructions include, in response to detection of the detected execution call, (i) restoring files of the target software application, including restoring the one or more executable files of the target software application to the directory and (ii) forwarding the detected execution call to the first executable file of the target software application in the directory to allow the first executable file of the target software application to process the detected execution call.

In other features, the execution call to the first replacement executable file is made by another application or an operating system. In other features, archiving files of the target software application includes archiving all files of the target software application that are not shared with another application. In other features, archiving files of the target software application includes archiving all files of the target software application. In other features, archiving files of the target software application includes at least one of (i) renaming the files of the target software application, (ii) moving the files of the target software application to a backup location, and (iii) deleting the files of the target software application.

In other features, the backup location is a directory within the memory. In other features, identifying the target software application includes searching for a software application that has not been used for at least a specified time period. In other features, identifying the target software application includes searching for a software application according to a specified list of one or more software applications.

In other features, archiving files of the target software application includes moving the files of the target software application to a backup location. Restoring the archived files of the target software application includes consulting an application version repository to determine whether the repository includes a newer version of the target software application than the target software application in the backup location. Restoring the archived files of the target software application includes, in response to determining that the application version repository includes a newer version, loading target software application files from the application version repository. Restoring the archived files of the target software application includes, in response to determining that the application version repository does not include a newer version, loading the target software application files from the backup location.

In other features, the instructions include creating a storage space preservation file in the directory. A size of the storage space preservation file corresponds to an amount of memory occupied by the target software application. In other features, the instructions include deleting the storage space preservation file in the directory immediately prior to restoring the files of the target software application to the directory. In other features, the instructions include following archiving of the files of the target software application, updating one or more registry entries to indicate that target software application has been uninstalled. The instructions include following restoration of the files of the target software application, updating the one or more registry entries to indicate that the target software application has been installed.

In other features, the instructions include storing an execution call log file in a log file storage location in response to restoring the files of the target software application. The execution call log includes at least a name of a source of the detected execution call. In other features, the instructions include storing a management log file in the log file storage location in response to archiving the files of the target software application. The management log file includes at least one of (i) information about the archived files of the target software application, (ii) information about the replacement executable files, and (iii) information about one or more registry entries associated with the target software application. In other features, detecting the execution call, restoring the files of the target software application, and forwarding the detected execution call are executed automatically without manual intervention by a user.

A method of archiving and restoring files of a target software application includes identifying a target software application, and archiving files of the target software application, including archiving one or more executable files from a directory of the target software application. The method includes creating, in the directory, one or more replacement executable files that correspond to the one or more executable files of the target software application. The method includes detecting, by a first replacement executable file of the one or more replacement executable files, an execution call to the first replacement executable file. The first replacement executable file corresponds to a first executable file of the target software application. The method includes, in response to detection of the detected execution call, restoring files of the target software application, including restoring the one or more executable files of the target software application to the directory, and forwarding the detected execution call to the first executable file of the target software application in the directory to allow the first executable file of the target software application to process the detected execution call.

In other features, archiving files of the target software application includes at least one of (i) renaming the files of the target software application, (ii) moving the files of the target software application to a backup location, and (iii) deleting the files of the target software application. In other features, identifying the target software application includes searching for a software application that has not been used for at least a specified time period or searching for a software application according to a specified list of one or more software applications.

In other features, archiving files of the target software application includes moving the files of the target software application to a backup location. Restoring the archived files of the target software application includes consulting an application version repository to determine whether the repository includes a newer version of the target software application than the target software application in the backup location, in response to determining that the application version repository includes a newer version, loading target software application files from the application version repository, and in response to determining that the application version repository does not include a newer version, loading the target software application files from the backup location.

In other features, the method includes, following archiving of the files of the target software application, updating one or more registry entries to indicate that target software application has been uninstalled, and following restoration of the files of the target software application, updating the one or more registry entries to indicate that the target software application has been installed.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Distributed software applications can become susceptible to security flaws if the latest patches, versions, etc. are not constantly maintained and updated. However, it can be very difficult to always find all instances of a distributed software application within a managed computer network (e.g., all instances of distributed JAVA applications on computers of a company network, etc.), in order to constantly maintain the latest updated patches, versions, etc. for all instances within the network.

In some cases, instances of a distributed software application that have not been used for some period of time may be uninstalled to avoid potential security flaws if the unused application is an outdated or unpatched version. However, if the uninstalled software is needed by a computer in the network at a later time, there could be production issues due to the removed software.

In various implementations, a recently unused software installation may be replaced with software replication files, while the original software application is archived to a backup storage location. If the original software application is called by another component of the computer network at a later time, the software replication files can intercept the call and restore the original software application (or an updated version of the original software application if available), while saving a detailed log of the software application call event.

As described above, a software application that has not been used in a specified time period (e.g., in the last ninety days, etc.) may be essentially unusable in its archived backup state, which can gracefully decommission the unused software application to reduce security risks, reduce commercial licensing subscriptions for the unused software applications, etc. At the same time, calls to the unused software application may be monitored in order to automatically restore the application if needed. The processes may be fully automated with the backup archiving, call monitoring, and software restoration functions taking place without any awareness or manual intervention by the user.

Figure 1:
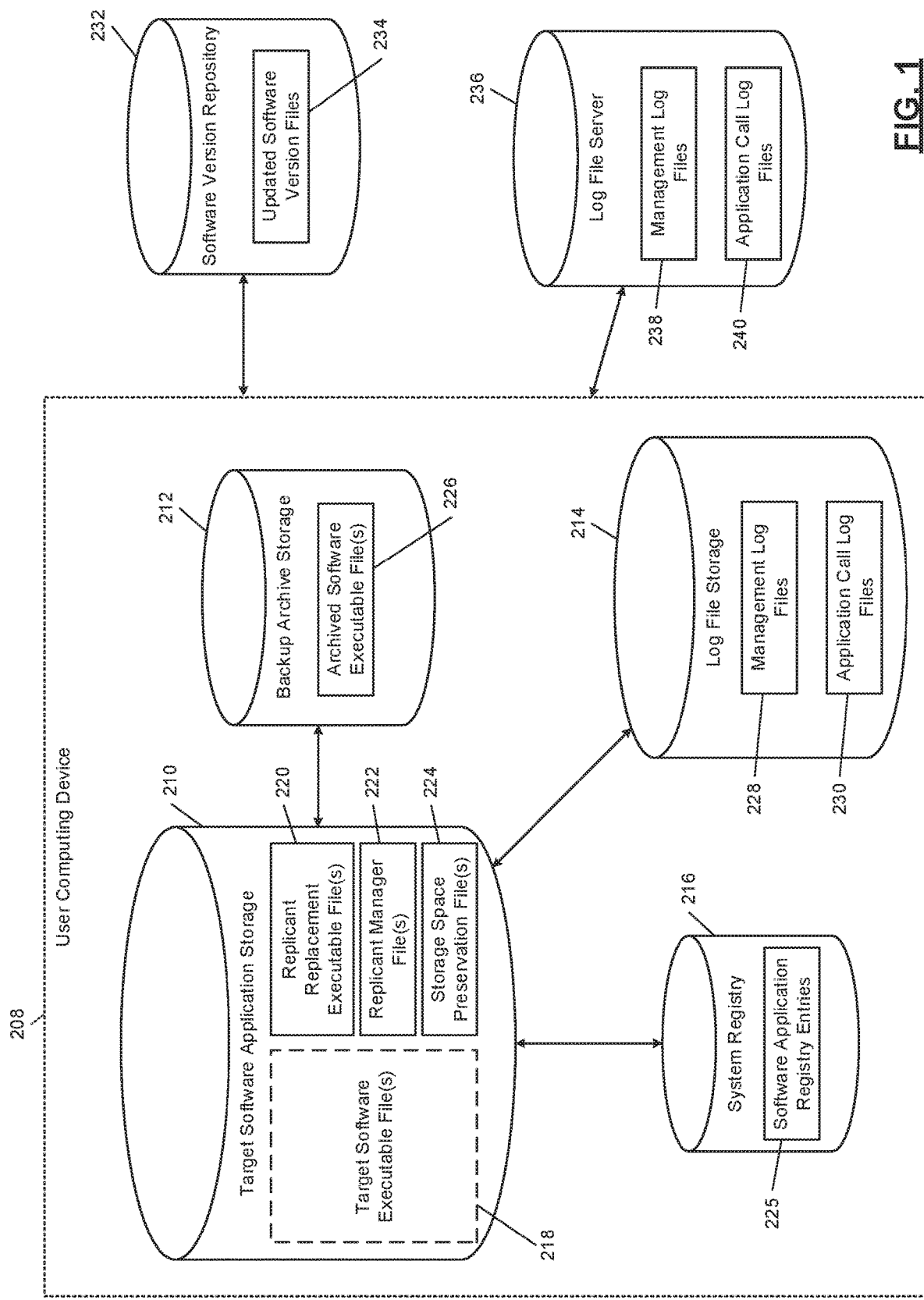
FIG. 1 is a functional block diagram of an example distributed software replication and replacement system.

FIG. 1 is a block diagram of an example implementation of a distributed software replication and retrieval system including a user computing device 208. While the user computing device 208 is generally described as being deployed in a managed computer network system (for example, a company computer network managed by an information technology (IT) department, etc.), the user computing device 208 and/or components of the user computing device may otherwise be deployed (for example, as a standalone computer setup, etc.). The user device 108 may be a desktop computer, a laptop computer, a tablet, a smartphone, etc.

As shown in FIG. 1, the user computing device 208 includes a target software application storage 210, a backup archive storage 212, a log file storage 214, and a system registry 216. The target software application storage 210, the backup archive storage 212, the log file storage 214, and the system registry 216, may be located in different physical memories within the user computing device 208, such as different random access memory (RAM), read-only memory (ROM), a non-volatile hard disk or flash memory, etc. In some implementations, one or more of the target software application storage 210, the backup archive storage 212, the log file storage 214, and the system registry 216, may be located in the same memory (e.g., in different address ranges of the same memory, etc.).

The target software application storage 210 includes target software executable files 218. The target software executable files 218 may include one or more executable files for a target application, which may be determined to be outdated, unpatched, a non-current version, etc. The target software executable files 218 may also include, or be associated with, other types of files such as data files of the target software application, etc.

The target software application storage 210 also includes software replication (SR) replacement executable files 220, and software replication manager files 222. When the target software executable files 218 are archived to the backup archive storage 212, the SR replacement executable files 220 may be deployed in place of the archived target software executable files 218. For example, for each executable file 218 in the target software application, a corresponding replacement executable file 220 may be deployed, which may have the same name, the same file extension, etc. as the original software executable file 218 it is replacing. In some implementations each replacement executable file 220 may be placed in the same directory as previously installed executable files 218 of the target software application.

The software replication manager files 222 may also be placed in the same directory as the replacement executable files 220 (e.g., the directory of the original target software executable files 218). The SR manager files 222 may include one or more files for managing aspects of the file replacement and retrieval processes. For example, the software replication manager files 222 may control deployment of the software replication replacement executable files 220, may control archiving of the original target software executable files 218 to the backup archive storage 212, may control logging of calls to the target software executable files 218 that are intercepted by the replacement executable files 220, may control updates to the system registry 216, etc.

The target software application storage 210 also includes one or more storage space preservation files 224. The storage space preservation files 224 may be used to preserve space for the target software executable files 218 in the target software application storage 210, while the target software executable files 218 are archived to the backup archive storage 212. The storage space preservation files 224 maintain space in case the target software executable files 218 are called at a future date, and need to be reinstalled, restored, redeployed, etc. in the target software application storage 210. For example, in the event that the target software executable files 218 are called at a future date, the storage space preservation files 224 may be deleted and the target software executable files 218 can be reinstalled in the space formerly occupied by the storage space preservation files 224.

In view of the above, the storage space preservation files 224 may be sized according to an installation size of the target software executable files 218. In some implementations, the storage space preservation files 224 may include additional storage space for data files associated with the target software executable files 218, may include additional space required to swap the target software executable files 218 into the target software application storage 210 from the backup archive storage 212 during reinstallation of the target software executable files 218, etc.

As shown in FIG. 1, backup archive storage 212 includes archived software executable files 226. As mentioned above, the backup archive storage 212 may be a different physical memory from the target software application storage 210, may be a different address range of the same physical memory as the target software application storage 210, etc. The archived software executable files 226 are stored in the backup archive storage 212 until retrieval by the SR manager file 222 in response to a call intercepted, detected, monitored, etc. by one of the replacement executable files 220.

When one of the replacement executable files 220 receives (e.g., intercepts, etc.) a call from another device, another software application of the user computing device 208, etc., the archived software executable files 226 may be reinstalled in the target software application storage 210. In some implementations, the user computing device 208 is in communication with a software version repository 232. The software version repository 232 may be located on a server and accessed over a network, etc. Examples of the network include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network may include an optical network. The network may be a local area network or a global communication network, such as the Internet. Moreover, multiple networks can be used, and the multiple networks may communicate in series and/or parallel with each other to link the user computing device 208 with the software version repository 232 and/or the log file server 236 (as described further below).

The software version repository 232 includes updated software version files 234. For example, the updated software version files 234 in the software version repository 232 may include maintained latest current versions, latest current patches, etc., of the target software executable files 218. When the replacement executable files 220 receive a call and the SR manager files 222 are restoring the archived software executable files 226, the manager files 222 may check whether the updated software version files 234 in the software version repository 232 are more current, more recent, etc. than the archived software executable files 226. If so, the manager files 222 may install the updated software version files 234 from the software version repository 232 into the target software application storage 210, instead of the archived software executable files 226.

As described above, the manager files 222 may store one or more log files in the log file storage 214. For example, the manager files 222 may store one or more management log files 228, which could include information about the archived software executable files 226, information about the replacement executable files 220, information about software application registry entries 225 of the target software executable files 218, installation and uninstallation information of the target software executable files 218, etc.

The log file storage 214 also includes application call log files 230. As described above, the manager files 222 may store a log event when another application attempts to call the target software executable files 218 while the target software executable files 218 are stored in the backup archive storage 212 as archived software executable files 226. If the replacement executable files 220 intercept the call from the other application, the manager files 222 may store the identity of the calling application, a time of the call from the other application, etc., in the application call log files 230 stored in the log file storage 214.

As shown in FIG. 1, the user computing device 208 may be in communication with a log file server 236 via a network. The log file server 236 may store management log files 238 and/or application call log files 240. For example, the management log files 238 may be similar to the management log files 228 of the log file storage 214, and the application call log files 240 may be similar to the application call log files 230 of the log file storage 214. In some implementations the manager files 222 may store log files only in the log file storage 214 on the user computing device 208, only on the log file server 236 in communication with the user computing device 208, or on both the log file server 236 and log file storage 214.

The system registry 216 is configured to store software application registry entries 225. The manager files 222 may update, modify, delete, etc., the registry entries associated with the target software executable files 218. For example, the manager files 222 may change the software application registry entries 225 when the target software executable files 218 are archived to the backup archive storage 212, or to indicate that the target software executable files 218 have been uninstalled, etc. When the archived software executable files 226 or the updated software version files 234 are restored to the target software application storage 210, the manager files 222 may update, add, modify, etc., the system registry 216 so the software application registry entries 225 indicate that the target software executable files to 218 are installed, etc.

The aforementioned operations may occur simultaneously, substantially simultaneously, or in a different order. In addition, more or fewer operations may be performed as at least part of the software replacement and retrieval process. Some or all of the foregoing operations may be performed by executing instructions stored in the user computing device 208 and/or an additional device. For example, in some implementations the user computing device 208 may include circuitry, a processor, a memory to store data and instructions, and communication functionality. The user computing device 208 is dedicated to performing processes, methods, and/or instructions described in this application. Other types of electronic devices may also be used that are specifically configured to implement the processes, methods, and/or instructions described in further detail below.

Message Sequence Chart

Figure 2:
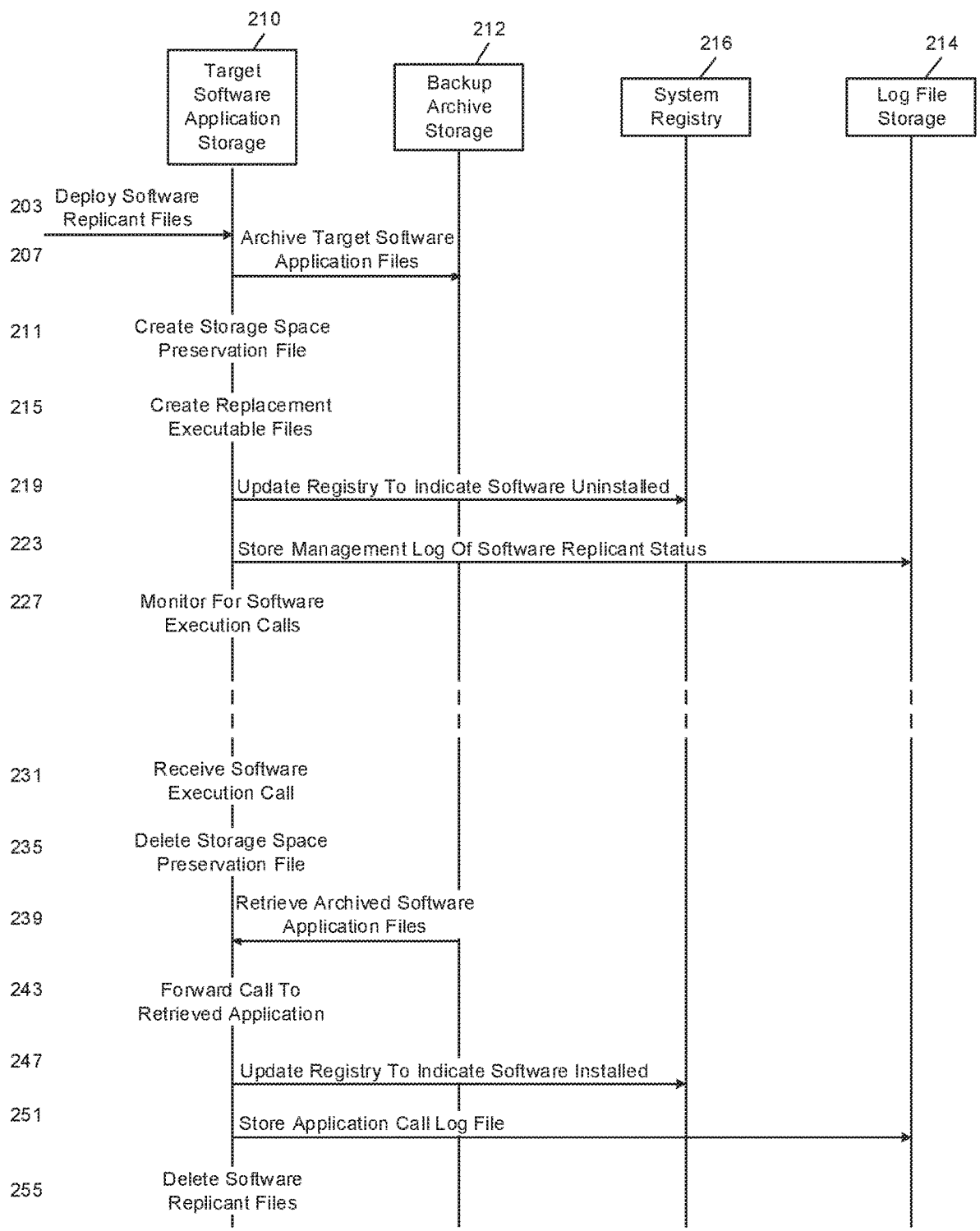
FIG. 2 is a message sequence chart showing example interactions between components of the system of FIG. 1.

In FIG. 2, interactions between the target software application storage 210, the backup archive storage 212, the system registry 216 and the log file storage 214 are illustrated, during the process of replacing the target software executable files with the software replication replacement executable files, and the process of retrieving the archived target software executable files in response to receiving a target software application execution call.

At line 203, the software replication replacement executable files are deployed to the target software application storage 210, and may be deployed in the same directory where the target software application files are stored. For example, software replication manager files may be deployed in the target application directory to initiate the archiving and replacement of the target software application files.

At line 207, the target software application files are archived by transferring the target software application files from the target software application storage 210 to the backup archive storage 212. In other implementations, the target software files may be archived by renaming the target software files and leaving the target software files in the same directory, etc. Although FIG. 2 illustrates deploying the SR files at line 203 prior to archiving the target software application files at line 207, in some implementations the target software application files may be archived from the target software application storage 210 to the backup archive storage 212 prior to deploying the SR files to the target software application storage 210, or the SR files may be deployed to the target software application storage 210 at the same time the target software application files are archived to the backup archive storage 212.

A storage space preservation file is created in the target software application storage 210, at line 211. For example, the storage space preservation file may be created to have approximately the same size that the target software application files occupied in the directory of the target software application storage 210 prior to archiving. In some implementations, the storage space preservation file may include additional space for data files of the target software application, the storage space preservation file may include additional space needed to swap the target software application files back into memory in the directory of the target software application storage 210 when the target software application files are reinstalled, etc.

At line 215, replacement executable files are created in the directory of the target software application storage 210. For example, the replacement executable files may have the same name as the archived target software application executable files, the same file extensions as the archive software application executable files, etc. Although FIG. 2 illustrates creating the replacement executable files at line 215 after deploying the SR files at line 203 and archiving the target software application files at line 207, in some implementations the replacement executable files may be created at the same time that the SR files are deployed at line 203. For example, the SR manager file may be deployed to the directory at line 203 and then wait to create the replacement executable files until after the target software application file names are recorded and the target software application files are archived to the backup archive storage 212, or the SR manager file may start creating the replacement executable files as soon as the SR manager file is deployed to the target software application storage 210. The SR replacement executable files may be created by overwriting the executable files of the target software application after the target software application files have been copied to the archive backup location.

At line 219, the system registry 216 may be updated to indicate that the target software application is uninstalled. For example, the SR manager file stored in the target software application storage 210 may change registry values in the system registry 216 to indicate that the target software application has been uninstalled, before or after the target software application files are archived in the backup archive storage 212.

Further, the SR manager file may store a management log file in the log file storage 214. For example SR manager file stored in the target software application storage 210 may store a management log file that includes information about the replacement executable files, information about the archived target software application files in the backup archive storage 212, information about the registry values updated in the system registry 216, etc.

The replacement executable files stored in the target software application storage 210 may then monitor for software execution calls at line 227. For example, the created SR replacement executable files may listen for calls to the target software application files from other applications. Sometime later, as indicated by dashes in FIG. 2 (which means that any period of time may have passed, from seconds to months or even years), one of the SR replacement executable files may receive a software execution call for the target software application files archived in the backup archive storage 212, at line 231.

In response to receiving the software execution call at line 231, the storage space preservation file may be deleted at line 235. For example, the SR manager file may delete the storage space preservation file stored in the target software application storage 210 in order to free space in the directory to reinstall the archived target software application files. At line 239, the archived software application files are retrieved from the backup archive storage 212 and installed in the target software application storage 210 (e.g., at the location of the deleted storage space preservation file, etc.).

Once the archived software application files are reinstalled in the directory in the target software application storage 210, the SR manager file forwards the intercepted call to the reinstalled target software application files at line 243. This allows the retrieved software application files to process the intercepted call as if the original software application files were installed in the directory of the target software application storage 210 all along. This process of archiving the target software application, monitoring for execution calls, and restoring the target software application, may be seamless to the user where the user does not realize the target software application file was previously stored in the backup archive storage 212 (e.g., the archiving and subsequent retrieval of the software application may not include any manual intervention by the user, etc.).

At line 247, registry entries in the system registry 216 may be updated to indicate that the target software application is reinstalled. For example, the SR manager file may change the registry entries in the system registry 216 back to the original installation values from when the target software application was previously installed in the directory of the target software application storage 210.

The SR manager file may store an application call log file in the log file storage 214, at line 251. The stored application call log file may include information about the name of the other application that called the archived target software application file, a time of the intercepted software execution call, etc.

At line 255, the SR files may be deleted. For example, any deployed SR files, any SR replacement executable files, any SR manager files, etc., may be deleted from the target software application storage 210, returning the target software application storage 210 to the original state where the target software application files were originally stored in the directory of the target software application storage 210.

Distributed Software Backup and Replication

Figure 3:
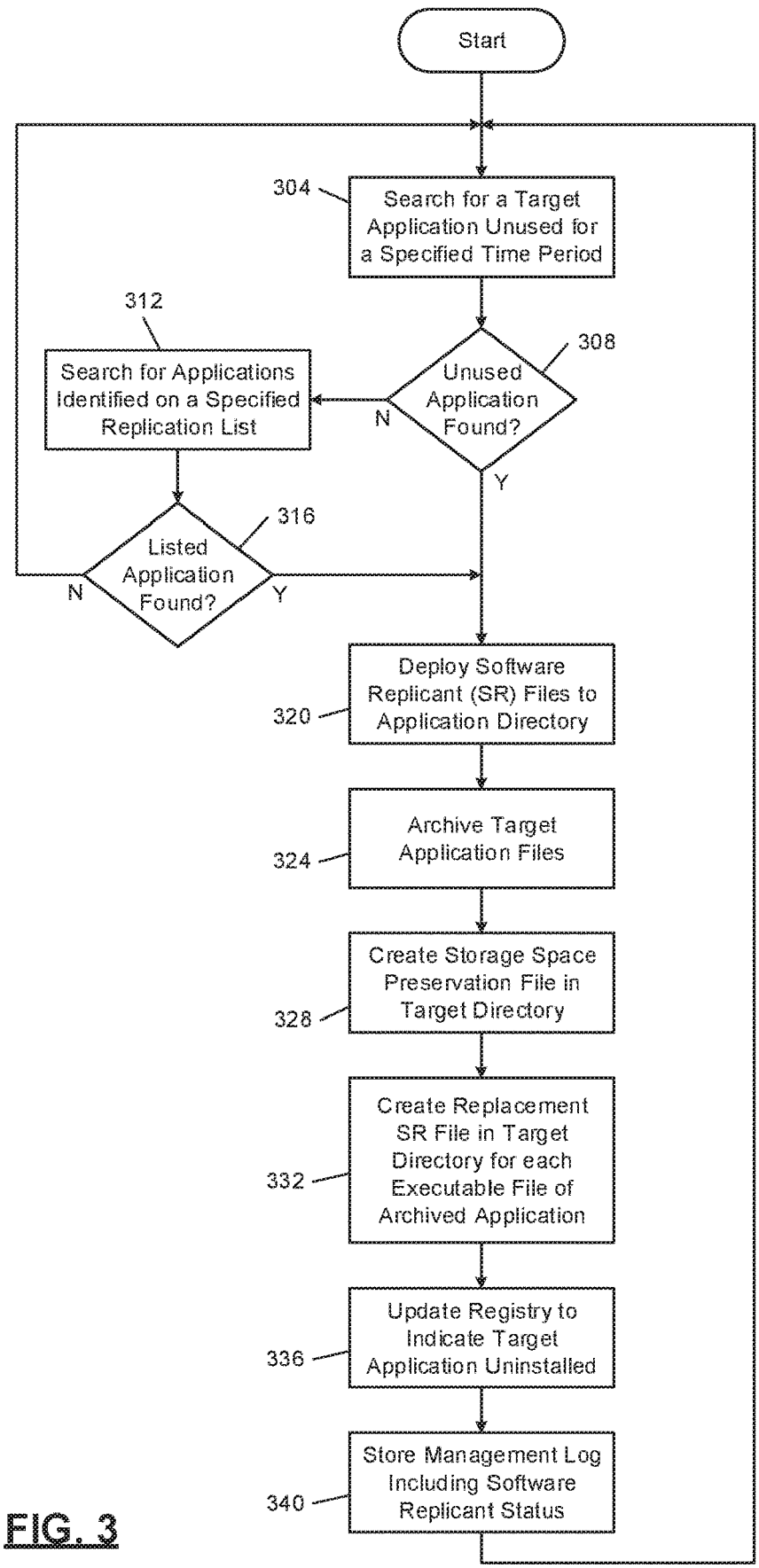
FIG. 3 is a flowchart depicting an example method of archiving and replicating a target distributed software application.

FIG. 3 is a flowchart depicting an example method of archiving and replicating a target distributed software application. Although the example method is described below with respect to the user computing device 208, the method may be implemented in other devices and/or systems. In various implementations, control may be performed by the user computing device 208.

In FIG. 3, control begins at 304, where control searches for a target software application that has been unused for a specified time period. For example, control may search the user computing device 208 (or other computing devices located in a distributed computer network system, etc.), for target applications have not been used for at least 90 days, for at least six months, for at least one year, for at least five years, etc. The searched for target applications may be selected from a specified list of target applications (e.g., only search for outdated JAVA applications, etc.), or control may search generally for any application that has not been used within the specified time period.

If an unused application is found at 308, control proceeds to deploy software replication files to the directory of the located application at 320. If no unused applications are found at 308, control proceeds to 312 to search for applications identified on a specified replication list. The specified replication list may include one or more identified applications where it is desired that all instances of the application should be archived using example processes described herein. For example, the manager of a distributed computer network system may decide to stop using, to archive, etc., all instances of a given application. The given application may be placed on the specified replication list and control can search for all instances of the application among computers of the distributed computer network at 312. If no listed applications are found at 316, control returns to 304 to again search for target software applications that have not been used in a specified time period. Searching at 304 may be performed periodically, on a continuous basis, etc. If a listed application is found that 316, control proceeds to 322 deploy the software replication files to the application directory.

Deploying the software replication files to the application directory at 320 may include installing one or more software replication manager files in the directory of the target software application. At 324, control archives the files of the target software application. For example, the software replication manager file may search the directory for all target software application data files, executable files, other files associated with the application, etc. This include crawling the directory based on a predefined list of files associated with the target software application, or searching the directory to record all instances of files stored in the directory of the target application. Control may then copy, move, transfer, etc. all of the target software application files to an archive backup storage location. In some implementations, control may rename the target software application files while leaving the files in the same application directory. Once the target application files are archived, they may be unusable to reduce the risk of a security threat, to be considered as not currently in use from a commercial licensing cost standpoint, etc.

At 328, control creates a storage space preservation file in the directory of the target application. The storage space preservation file may be a blank file that occupies enough space for reinstallation of the target software application at a later time, such as when the software replication replacement executable files intercept an execution call from another application, for the archived target software application. The storage space preservation file may have approximately the same size as the amount of memory space occupied by the target software application files when the target software application files were originally installed in the directory. In some implementations, the storage space preservation file may include additional space for other data files associated with the target software application, may include additional space needed to swap the target software application files into memory when the target software application files are restored from the archived backup location at a later date, etc.

Control then proceeds to 332 to create SR replacement executable files in the target directory for each executable file of the archived target software application. For example, and as mentioned above, the software replication manager file may record a file name, a file extension, etc. for each of the executable files of the originally installed target software application. The SR manager file creates a new executable file for each executable file of the originally installed target software application, where the newly created SR replacement executable files include the same file names and file extensions as their corresponding originally installed target software application files. While FIG. 3 illustrates creation of the replacement SR files in the target directory at 332 after archiving the target software application files at 324 and creating the storage space preservation file in the target directory at 328, in some implementations the replacement executable files may be created prior to or at the same time as archiving the target software application files or creating the storage space preservation file.

At 336, control updates the registry to indicate that the target application is uninstalled. For example, an SR manager file may record registry information about the originally installed target software application, and use the recorded registry information to update, modify, change, etc. the registry entries corresponding to the target software application in the registry. Accordingly, the updated registry may indicate that target software application has been uninstalled.

Control may store a management log at 340, where the management log includes status information about the software replication process. For example, the management log file may include information about the deployed software replication files in the target directory, may include information about the archived target software application files in the backup storage, may include information about the registry entries of the target software application, etc.

After completing deployment of the software replication files, archiving of the target software application files, and creation of the SR replacement executable files in the target directory, control may return to 304 to again search for another target application that has not been used within the specified timer period. During this time, the SR replacement executable files that were created in the target directory may monitor, listen for, etc. any execution calls for the archived target software application.

Distributed Software Retrieval and Restoration

Figure 4:
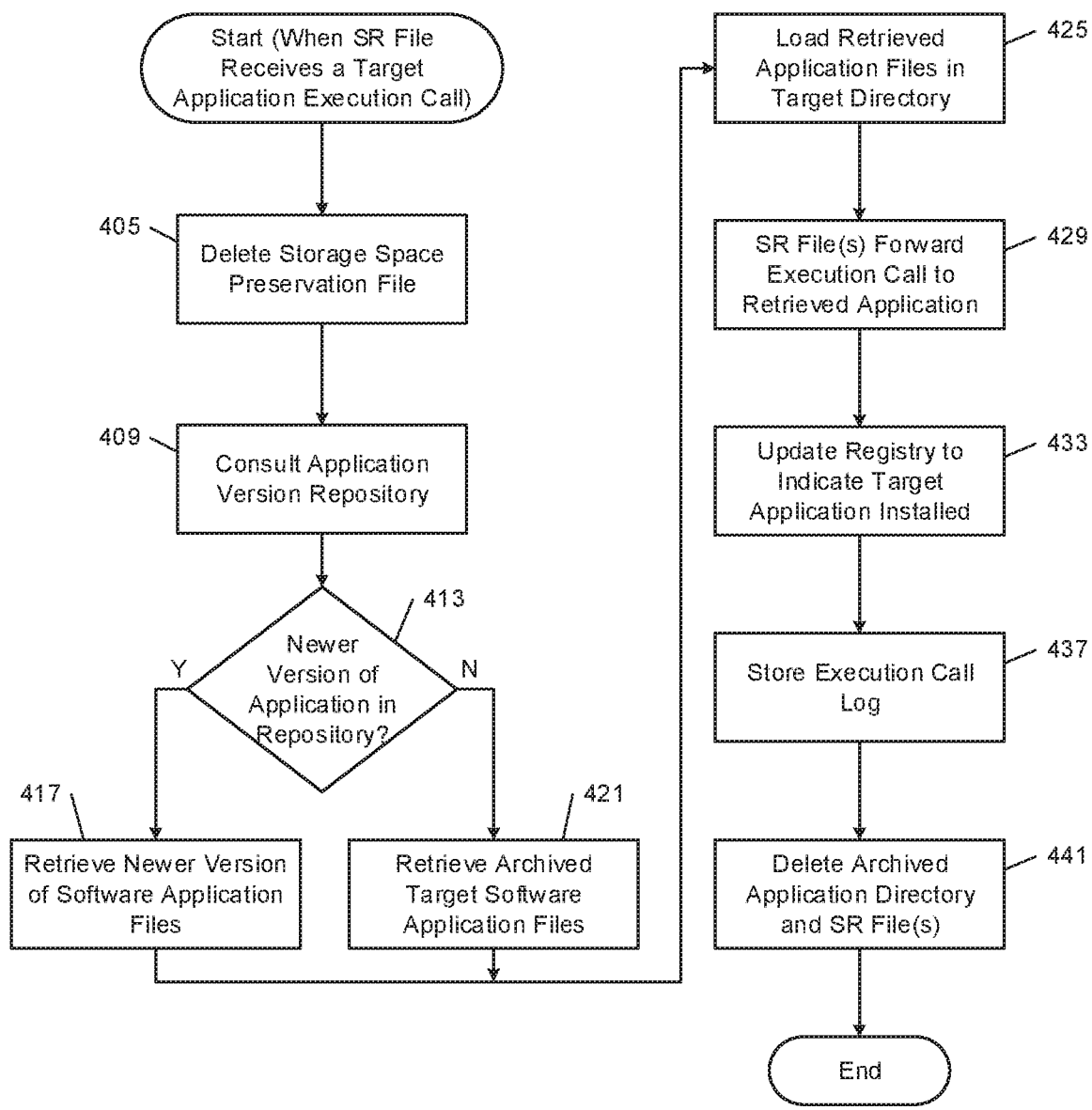
FIG. 4 is a flowchart depicting an example method of retrieving and restoring an archived distributed software application.

FIG. 4 is a flowchart depicting an example method of retrieving and restoring an archived distributed software application. Although the example method is described below with respect to the user computing device 208, the method may be implemented in other devices and/or systems. In various implementations, control may be performed by the user computing device 208.

Control begins at 405, which may occur in response to an SR executable file receiving or intercepting an execution call for the archived target software application. For example, another application may make an execution call for an executable file having the same file name and extension as one of the created SR replacement executable files. In some implementations, the process illustrated in FIG. 4 may occur after the process illustrated in FIG. 3 has archived the target software application files to the backup storage and created the SR replacement executable files.

At 405, control deletes the storage space preservation file in order to free up space to reinstall the target software application files. At 409, control consults an application version repository, to determine whether any newer versions of the archived target software application are stored in the repository at 413. For example, the application version repository may be periodically or continuously updated to maintain a most recent version, a fully patched version, etc. of the target software application. Control can check the application version repository at 409 to determine whether the archived application in the backup storage should be retrieved for reinstallation, or whether a newer version may be retrieved from the application version repository for installation.

If a newer version of the application is available in the repository at 413, control retrieves the newer version of the software application files at 417. If a newer version of the application is not available in the repository at 413 (e.g., the archived target software application is still the most recent version available), control retrieves the archived target software application files at 421. At 425, control loads (e.g., installs, transfers, copies, etc.) the retrieved application files in the target directory. For example, control loads the newer version of the software application files if a newer version was retrieved from the application version repository, or loads the archived target software application files from the backup storage if no newer version was available in the repository.

After installing the retrieved application files in the target directory, control proceeds to 429 where the SR files forward the intercepted execution call to the reinstalled application. The reinstalled application executable file may then process the intercepted execution call as if the target software application had been installed in the target directory all along. Control may then update the registry at 433 to indicate that the target application has been installed.

At 437, control stores an execution call log file including information about the execution call. For example, the execution call log file may include information about the other application that issued the execution call for the target software application, a time of the execution call, etc. At 441, control deletes the archived application directory in the backup storage, and deletes the SR files from the target directory. At this point, the target software application has been reinstalled the target directory (with a more recent version if available from the application version repository), with the SR files and the archived storage files removed, and the process was invisible to the user as though the target software application was installed in the target directory all along. For example, control may automatically retrieve and reinstall the target software application automatically in response to intercepting the execution call, without any manual intervention from the user.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
memory configured to store software application files and computer executable instructions; and
a processor configured to execute the computer executable instructions, wherein the instructions include:
identifying a target software application;
archiving files of the target software application, including archiving one or more executable files from a directory of the target software application;
creating, in the directory, (i) one or more replacement executable files that correspond to the one or more executable files of the target software application and (ii) a software replication manager file for controlling deployment of the one or more replacement executable files, wherein the one or more replacement executable files have the same file names and file extensions as the corresponding one or more executable files of the target software application;
detecting, by a first replacement executable file of the one or more replacement executable files, an execution call to the first replacement executable file, wherein the first replacement executable file corresponds to a first executable file of the target software application, and wherein the execution call is made by at least one of an operating system and a second application; and
in response to detection of the detected execution call:
restoring files of the target software application, including restoring the one or more executable files of the target software application to the directory and
forwarding the detected execution call to the first executable file of the target software application in the directory to allow the first executable file of the target software application to process the detected execution call, wherein detecting the execution call, restoring the files of the target software application, and forwarding the detected execution call are executed automatically without manual intervention by a user.

2. The computer system of claim 1, wherein archiving files of the target software application includes archiving all files of the target software application that are not shared with another application.

3. The computer system of claim 1, wherein archiving files of the target software application includes archiving all files of the target software application.

4. The computer system of claim 1, wherein archiving files of the target software application includes at least one of (i) renaming the files of the target software application, (ii) moving the files of the target software application to a backup location, and (iii) deleting the files of the target software application.

5. The computer system of claim 4, wherein the backup location is a directory within the memory.

6. The computer system of claim 1, wherein identifying the target software application includes searching for a software application that has not been used for at least a specified time period.

7. The computer system of claim 1, wherein identifying the target software application includes searching for a software application according to a specified list of one or more software applications.

8. The computer system of claim 1, wherein:
archiving files of the target software application includes moving the files of the target software application to a backup location; and
restoring the archived files of the target software application includes:
consulting an application version repository to determine whether the repository includes a newer version of the target software application than the target software application in the backup location;
in response to determining that the application version repository includes a newer version, loading target software application files from the application version repository; and
in response to determining that the application version repository does not include a newer version, loading the target software application files from the backup location.

9. The computer system of claim 1, wherein:
the instructions include creating a storage space preservation file in the directory;
the storage space preservation file is unusable as the target application; and
the storage space preservation file is created such that a size of the storage space preservation file is based on an amount of memory occupied by the target software application, thereby occupying enough space for reinstallation of the target software application at a later time.

10. The computer system of claim 9, wherein the instructions include deleting the storage space preservation file in the directory immediately prior to restoring the files of the target software application to the directory.

11. The computer system of claim 9, wherein the storage space preservation file is blank.

12. The computer system of claim 1, wherein the instructions include:
following archiving of the files of the target software application, updating one or more registry entries to indicate that target software application has been uninstalled and
following restoration of the files of the target software application, updating the one or more registry entries to indicate that the target software application has been installed.

13. The computer system of claim 1, wherein:
the instructions include storing an execution call log file in a log file storage location in response to restoring the files of the target software application and
the execution call log includes at least a name of a source of the detected execution call.

14. The computer system of claim 13, wherein:
the instructions include storing a management log file in the log file storage location in response to archiving the files of the target software application and
the management log file includes at least one of (i) information about the archived files of the target software application, (ii) information about the replacement executable files, and (iii) information about one or more registry entries associated with the target software application.

15. A method of archiving and restoring files of a target software application, the method comprising:
    identifying a target software application;
    archiving files of the target software application, including archiving one or more executable files from a directory of the target software application;
    creating, in the directory, (i) one or more replacement executable files that correspond to the one or more executable files of the target software application and (ii) a software replication manager file for controlling deployment of the one or more replacement executable files, wherein at least one of the replacement executable files includes a same file name as at least one of the executable files of the target software application;
    detecting, by a first replacement executable file of the one or more replacement executable files, an execution call to the first replacement executable file, wherein the first replacement executable file corresponds to a first executable file of the target software application, and wherein the execution call is made by at least one of an operating system and a second application; and
    in response to detection of the detected execution call:
        restoring files of the target software application, including restoring the one or more executable files of the target software application to the directory and
        forwarding the detected execution call to the first executable file of the target software application in the directory to allow the first executable file of the target software application to process the detected execution call, wherein detecting the execution call, restoring the files of the target software application, and forwarding the detected execution call are executed automatically without manual intervention by a user.

16. The method of claim 15, wherein archiving files of the target software application includes at least one of (i) renaming the files of the target software application, (ii) moving the files of the target software application to a backup location, and (iii) deleting the files of the target software application.

17. The method of claim 15, wherein identifying the target software application includes:
    searching for a software application that has not been used for at least a specified time period or
    searching for a software application according to a specified list of one or more software applications.

18. The method of claim 15, wherein:
    archiving files of the target software application includes moving the files of the target software application to a backup location; and
    restoring the archived files of the target software application includes:
        consulting an application version repository to determine whether the repository includes a newer version of the target software application than the target software application in the backup location;
        in response to determining that the application version repository includes a newer version, loading target software application files from the application version repository; and
        in response to determining that the application version repository does not include a newer version, loading the target software application files from the backup location.

19. The method of claim 15, further comprising:
    following archiving of the files of the target software application, updating one or more registry entries to indicate that target software application has been uninstalled and
    following restoration of the files of the target software application, updating the one or more registry entries to indicate that the target software application has been installed.

* * * * *